United States Patent [19]

Komoto

[11] Patent Number: 5,014,036
[45] Date of Patent: May 7, 1991

[54] THERMAL AND CURRENT SENSING SWITCH

[75] Inventor: Kazumasa Komoto, Oita, Japan
[73] Assignee: Orient Co., Ltd., Oita, Japan
[21] Appl. No.: 468,396
[22] Filed: Jan. 22, 1990
[30] Foreign Application Priority Data Jan. 25, 1989 [JP] Japan .................................. 1-17020

[51] Int. Cl.$^5$ ..................... H01H 37/76; H01H 85/00
[52] U.S. Cl. ...................................... 337/407; 337/4; 337/403
[58] Field of Search ......................................... 337/1-5, 337/35, 299, 401-409, 143

[56] References Cited

U.S. PATENT DOCUMENTS 3,828,289  8/1974  Hickling .................................... 337/5
4,292,616  9/1981  Andersen ............................ 337/143
4,380,001  4/1983  Kasamatsu ................................ 337/5

Primary Examiner—Harold Broome
Attorney, Agent, or Firm—Jordan and Hamburg

[57] ABSTRACT

A thermal and current sensing switch which brakes an associated electric circuit when an overcurrent is supplied to the electric circuit or the temperature of the electric apparatus rises beyond a predetermined temperature. The thermal and current sensing switch comprises a housing, fixed conductors fixed to the housing with the base ends thereof extended within the housing; a current fuse placed in the housing with the opposite terminals thereof in contact with the fixed conductors; a first spring biasing the current fuse away from the fixed conductors, a second spring pressing the current fuse against the fixed conductors against the force of the first spring, and a temperature sensing element provided between the housing and the second spring. When the ambient temperature rises beyond a predetermined temperature, the temperature sensing element reduces the force of the second spring to allow the first spring to separate the current fuse from the fixed conductors to break the electric circuit. The current fuse and the temperature sensing element are isolated electrically and thermal from each other so that the same are able to function independently.

7 Claims, 5 Drawing Sheets

THERMAL AND CURRENT SENSING SWITCH

BACKGROUND OF THE INVENTION

1. Field of the Invention

The present invention relates to a thermal and current sensing switch capable of breaking an electric circuit in response to an overcurrent or a short-circuit current to protect overcurrent accidents and breaking the electric circuit to protect excessive temperature rise upon the detection of rise in the ambient temperature.

2. Prior Art

It is generally known to employ a current fuse to break an electric circuit when an overcurrent is supplied to the electric circuit, and to employ a thermal fuse or a thermostat which breaks an electric circuit upon the detection of an abnormal rise in the ambient temperature to protect the excessive rise in the temperature of the electric apparatus. Generally, the current fuse, and the thermal fuse or the thermostat are provided individually in the electric apparatus.

Efforts have been made to break an electric circuit by the action of a thermal fuse when an overcurrent flows through the electric circuit as well as responding to a rise in the ambient temperature.

Furthermore, efforts have been made to protect both excessive rise in the temperature of an electric apparatus and overcurrent accidents in the electric circuit by the action of a circuit protecting device comprising a series arrangement or an integral combination of a thermal sensing fuse element and an overcurrent sensing fuse element.

With the thermal fuse or the like for protecting excessive temperature rise, it is most important that the thermal fuse responds to ambient temperature at a high accuracy, i.e. at least within the range of several degrees centigrade for the predetermined temperature. However, heat generated in the electric apparatus by a current flowing through the electric circuit adversely affects the temperature accuracy of the thermal fuse.

With a current fuse or the like for protecting overcurrent, relation of response times to several values of overcurrents resulting from overloading, for example, a current of 135% or 200% of the rated current of the circuit, namely, a current-time characteristic, is an important factor. Furthermore, ability of safely and surely breaking the associated electric circuit in response to a large current, such as a short-circuit current, namely, breaking capacity, is another important factor of the current fuse. Generally, the thermal sensing device is placed in a place of a temperature higher than a room temperature when the associated electric circuit is in the normal operating state. Therefore, the overcurrent sensing ability of the current fuse must not be subject to the influence of the ambient temperature.

Since a thermal fuse is designed so that the influence of Joule heat is eliminated almost completely, when a thermal fuse is used to brake an electric circuit by the Joule heat, the thermal fuse does not respond to an overcurrent not much higher than the rated current and it is unable to break the associated electric circuit safely and surely when a very high overcurrent, particularly, a short-circuit current, flows through the electric circuit because its contacts weld or its fuse element explodes. Accordingly, such a thermal fuse is effective only with an overcurrent in a narrow range.

The thermal sensing fuse element and the overcurrent sensing fuse element of the foregoing circuit protecting device are connected in an electrically conductive manner, and hence the thermal sensing fuse element is subject to the influence of Joule heat. When the overcurrent sensing fuse element is formed of an alloy such as tin, lead or bismuth having a comparatively low melting point to suppress temperature rise attributable to Joule heat evolved by a normal operating current, the fuse element fuses at a low temperature when an overcurrent flows therethrough, the current-time characteristic of the current fuse is affected greatly by slight rise in the ambient temperature, and it happens that the current fuse is deteriorated or is caused to fuse by a current lower than the rated current. Furthermore, the breaking speed of a current sensing device employing a fuse element having a comparatively low melting point under an overcurrent is low and the breaking capacity of the same for a large current is small, because capacity of the fusible element is large.

When a fuse element having a comparatively high melting point, such as a silver, copper, nickel or tungsten fuse element, is employed to give priority to the current characteristic of the circuit protecting device, increased heat is generated at the normal operating current to enhance the influence of heat on the thermal sensing element remarkably deteriorating the thermal sensing accuracy.

The response temperature of some thermal sensing element is determined taking into consideration both the influence of heat generated by the current flows through the thermal sensing element itself and that of heat generated by the current flows through the associated current sensing element. However, it is difficult to stabilize the temperature sensing accuracy of such a thermal sensing element under a high operating current because the temperature sensing accuracy is affected significantly by the assembling accuracy, the quality of the material and small dimensional errors, and hence only thermal sensing elements of such a type having a small current capacity are feasible. When the response temperature is determined taking into consideration temperature rise resulting from heat evolved by a current in addition to the ambient temperature, a constant current must be supplied to the associated circuit at all times, which, however, is difficult to be met by general electric equipments.

Basically, the current fuse must respond sharply to Joule heat evolved by a current and is not significantly susceptible to the ambient temperature, while the thermal fuse must respond sharply to the ambient temperature and must not be susceptible to Joule heat evolved by a current. Such requirements apply also to heat sensing devices other than thermal fuses, such as thermostats.

It has been difficult for the prior art to provide a device meeting both the basic characteristics contrary to each other; giving priority to one of the basic characteristics unavoidably entails the degradation of the other.

Accordingly, it has been necessary to provide an electric circuit individually with a protective device for protecting the electric circuit from overcurrent and a protective device for protecting excessive temperature rise to ensure the protection of burning accidents in the electric apparatus.

SUMMARY OF THE INVENTION

Accordingly, it is an object of the present invention to provide a thermal and current sensing switch for protecting excessive temperature rise and overcurrent in an electric circuit, capable of accurately sensing temperature without being affected by current and accurately responding to overcurrent without being significantly affected by the ambient temperature, and having a sufficient breaking capacity.

To achieve the object, the present invention provides a thermal and current sensing switch comprising: a housing; a pair of fixed conductors fixed to the housing with their base ends extended within the housing; a current fuse placed within the housing with the opposite terminals thereof in contact respectively with the fixed conductors conductively; an elastic separating member biasing the current fuse away from the fixed conductors; an elastic pressing member pressing the terminals of the current fuse against the fixed conductors against the biasing force of the elastic separating member; and a thermal sensing member capable of reducing the working force of the elastic pressing member when the ambient temperature reaches to a predetermined temperature.

The current fuse comprises an insulating support formed of glass, a ceramic or a plastic and in a suitable shape, such as the shape of a plate or a tube, a pair of terminals formed of a conductive material, such as a copper alloy, and attached respectively to the opposite ends of the insulating support so as to be placed in contact respectively with the fixed conductors, and a current sensing element formed of a material having an excellent overcurrent characteristic, such as copper, silver or tungsten, and extended between and attached by soldering or the like to the terminals.

When a current exceeding a predetermined current flows through an electric circuit consisting of the fixed conductors and the current fuse, the current sensing element fuses to disconnect the fixed terminals.

When the thermal sensing element is heated to a predetermined temperature due to rise in the ambient temperature, the current fuse is separated from the fixed conductors by the fusion or dimensional change of the thermal sensing element. The thermal sensing element is separated from and electrically isolated from the electric circuit by an insulating member having a low thermal conductivity to suppress the influence of heat evolved by a current supplied to the electric circuit on the function of the thermal sensing element.

BRIEF DESCRIPTION OF THE DRAWINGS

The above and other objects, features and advantages of the present invention will become more apparent from the following description taken in conjunction with the accompanying drawings, in which.

DETAILED DESCRIPTION OF THE PREFERRED EMBODIMENTS

First Embodiment (FIGS. 1, 2, 3, 4, 5)

Figure 1:
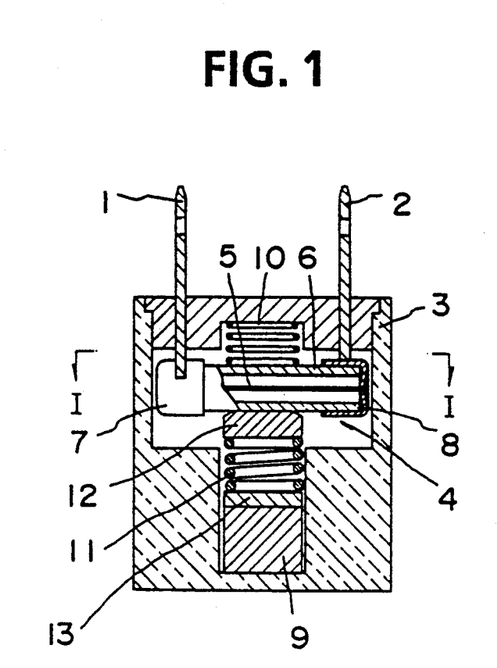
FIG. 1 is a longitudinal sectional front view of a thermal and current sensing switch in a first embodiment according to the present invention.
Figure 2:
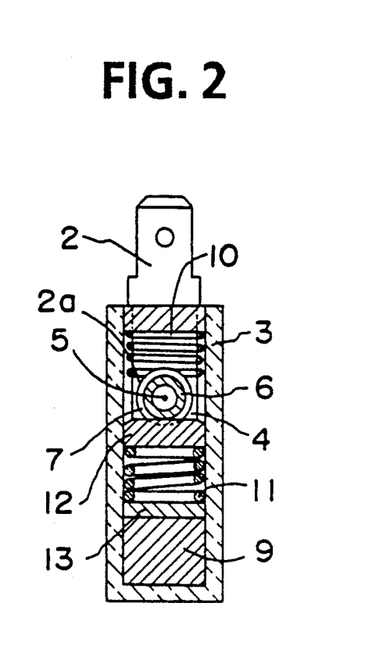
FIG. 2 is a longitudinal sectional side view of the thermal and current sensing switch of FIG. 1.
Figure 3:
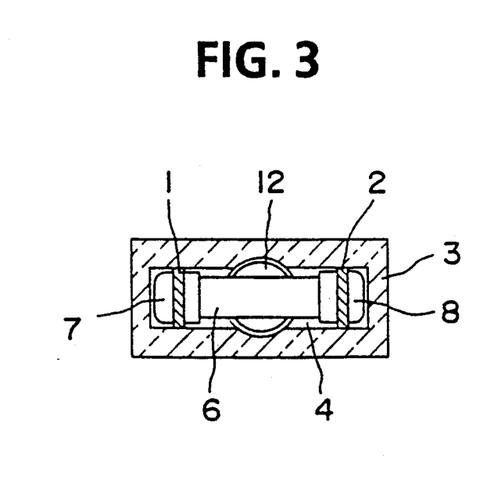
FIG. 3 is a sectional plan view taken on line I—I in FIG. 1.

Referring to FIG. 1, a pair of fixed conductors 1 and 2 are fixed to the upper wall of a housing 3 with the lower ends thereof extended into a cavity formed within the housing 3. A current fuse 4 is placed in the cavity of the housing 3. The fixed conductors 1 and 2, and the current fuse 4 constitute an electric circuit. The current fuse 4 consists of an insulating tube 6 formed of glass or a ceramic, a pair of terminals 7 and 8 adhesively attached respectively to the opposite ends of the insulating tube 6, and a current sensing fuse element 5 extended within the insulating tube 6 and soldered at the opposite ends thereof to the terminals 7 and 8. The current fuse 4 is pressed against the fixed terminals 1 and 2 at all times by a pressing spring 11 placed in a bottomed hole formed in the bottom wall of the housing 3. The lower ends of the fixed conductors 1 and 2 are cut in shapes respectively fitting the circumferences of the terminals 7 and 8 so that the terminals 7 and 8 are in stable contact respectively with the fixed conductors 1 and 2.

A separating spring 10 for separating the current fuse 4 from the fixed conductors 1 and 2 is placed in a bottomed hole formed in the upper wall of the housing 3 so as to bias the current fuse 4 away from the fixed conductors 1 and 2. The working force of the separating spring 10 is far smaller than that of the pressing spring 11, and hence, in a normal state, the separating spring 10 is unable to separate the current fuse 4 from the fixed conductors 1 and 2.

A thermal sensing element 9 is placed under the pressing spring 11 in the bottom of the bottomed hole formed in the lower wall of the housing 3. The thermal sensing element 9 is a piece of metal or an organic material having a low melting point. A separating member 12 is placed between the current fuse 4 and the pressing spring 11. The separating member 12 is formed of plastic or a ceramic having a low thermal conductivity. A spring seat 13 is provided between the pressing spring 11 and the thermal sensing element 9 so that the force of the pressing spring 11 is distributed uniformly on the upper surface of the thermal sensing element 9.

When an overcurrent flows through the electric circuit consisting of the fixed conductors 1 and 2 and the current fuse 4, the fusible current sensing fuse element 5 fuses to break the electric circuit.

Figure 4:
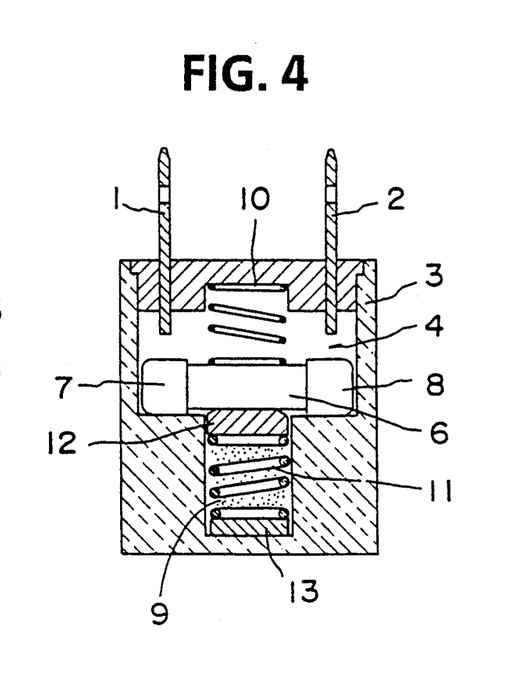
FIG. 4 is a longitudinal sectional front view of the thermal and current sensing switch of FIG. 1 in a state after a circuit breaking action.

When the thermal sensing element 9 is heated to a predetermined temperature due to rise in the ambient temperature, the thermal sensing element 9 fuses to allow the pressing spring 11 to expand as shown in FIG. 4. Consequently, the working force of the pressing spring 11 decreases to zero or to a force below the working force of the separating spring 10 to enable the separating spring 10 to break the electric circuit by separating the current fuse 4 from the fixed conductors 1 and 2.

Figure 5:
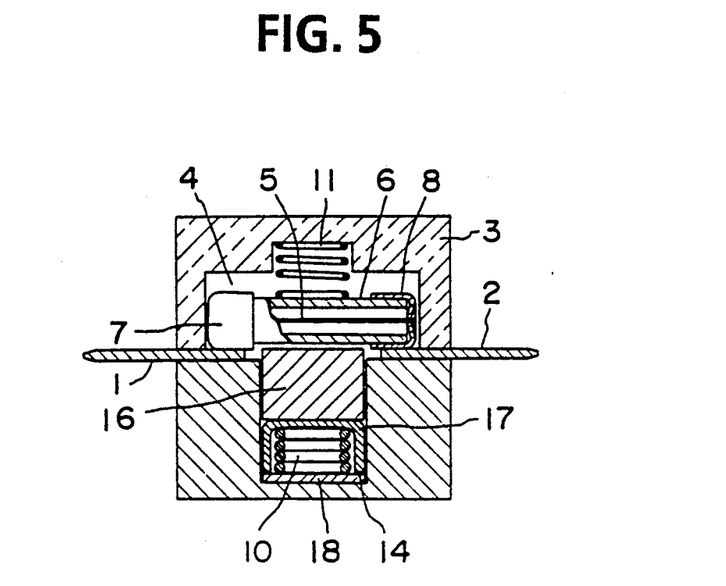
FIG. 5 is a longitudinal sectional front view of a thermal and current sensing switch in a second embodiment according to the present invention.
Figure 6:
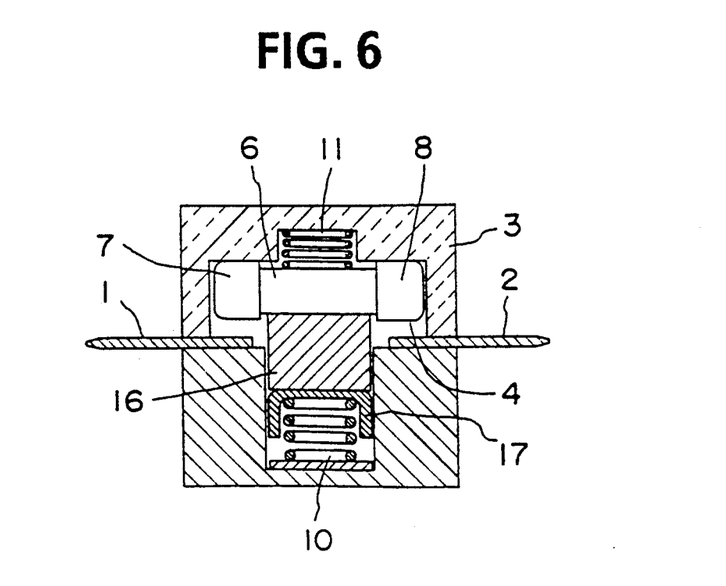
FIG. 6 is a longitudinal sectional front view of the thermal and current sensing switch of FIG. 5 in a state after a circuit breaking action.

Second Embodiment (FIGS. 5, 6)

Referring to FIG. 5, a thermal and current sensing switch in a second embodiment according to the present invention comprises a housing 3, a pair of fixed conductors 1 and 2 fixed respectively to opposite side walls of the housing 3 with the inner ends thereof extended within a cavity formed in the housing 3, a current fuse 4 placed within the cavity with its terminals 7 and 8 in contact respectively with the inner ends of the fixed conductors 1 and 2, a pressing spring 11 pressing the current fuse 4 against the fixed conductors 1 and 2, a separating spring 10 placed in a bottomed hole formed in the lower wall of the housing 3, a cap 17 having a cross section resembling the letter U and welded to the bottom surface of the bottomed hole by a thermal sensing fusible metal 14 to compress the separating spring 10 in the bottomed hole so that the force of the separating spring 10 may not act on the current fuse 4, and a separating member 16 placed between the current fuse 4 and the cap 17. When the thermal sensing fusible metal 14 fuses, the compressed separating spring 10 is allowed to expand. Since the force of the separating spring 10 is greater than that of the pressing spring 11, the current fuse is separated from the fixed conductors 1 and 2 when the thermal sensing fusible metal 14 fuses. The separating member 16 suppresses heat transfer from the current fuse 4 to the thermal sensing fusible metal 14, and transmits the force of the separating spring 10 to the current fuse 4 when the separating spring 10 is allowed to expand.

Figure 7:
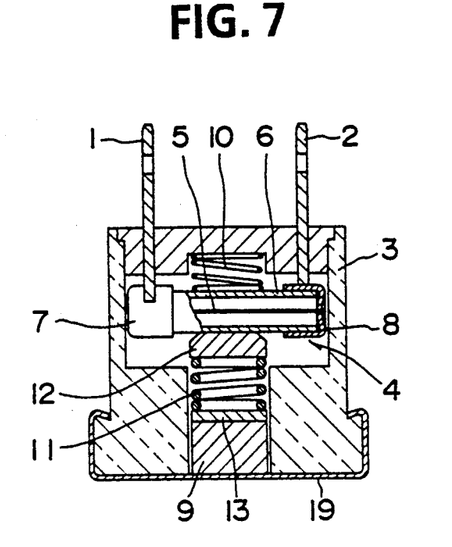
FIG. 7 is a longitudinal sectional front view of a thermal and current sensing switch in a third embodiment according to the present invention.
Figure 8:
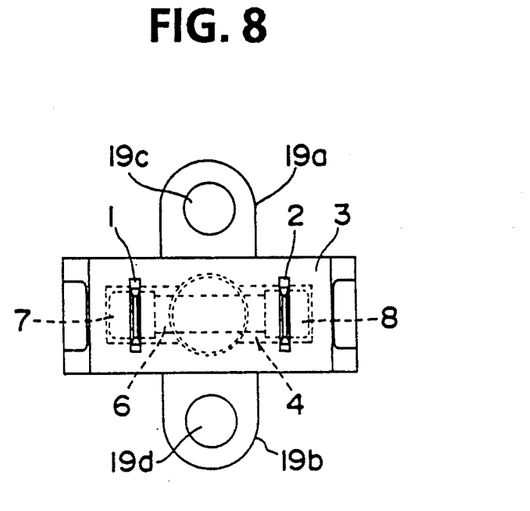
FIG. 8 is a plan view of the thermal and current sensing switch of FIG. 7.

Third Embodiment (FIGS. 7, 8)

A thermal and current sensing switch in a third embodiment according to the present invention is substantially the same in construction as the thermal and current sensing switch of FIG. 1, except that the former is provided with a heat transferring member 19 attached to the bottom of the housing 3. The heat transferring member 19 is formed of a metal and screwed firmly to an associated equipment to transfer heat from the equipment through the housing 3 to the thermal sensing element 9.

Figure 9:
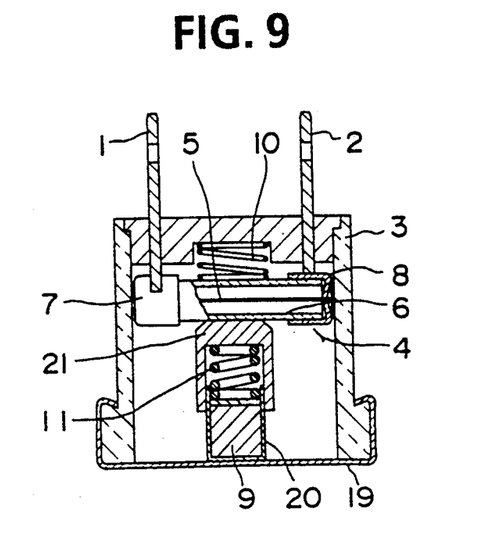
FIG. 9 is a longitudinal sectional front view of a thermal and current sensing switch in a fourth embodiment according to the present invention.
Figure 10:
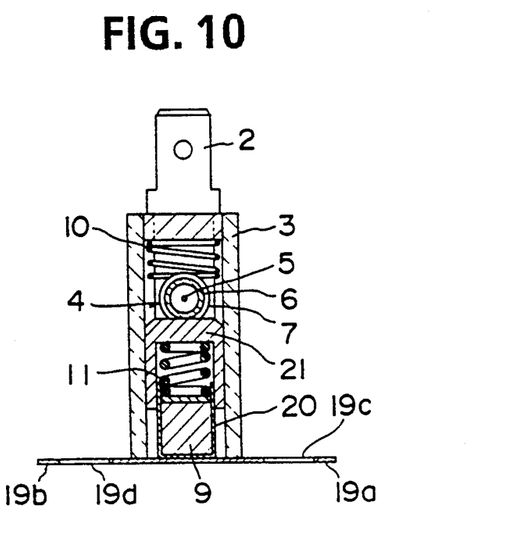
FIG. 10 is a longitudinal sectional side view of the thermal and current sensing switch of FIG. 9.

Fourth Embodiment (FIGS. 9, 10)

A thermal and current sensing switch in a fourth embodiment according to the present invention is similar in construction to the thermal and current sensing switch of FIG. 7, except that the lower end of the housing 3 is open, a heat transferring member 19 is attached to the lower end of the housing 3 so as to close the same, a metallic container 20 is placed on the inner surface of the heat transferring member 19, a thermal sensing element 9 is placed in the metallic container 20, and an insulating cap 21 is put on the pressing spring 11. The heat transferring member 19 is attached firmly to an associated equipment so that heat is transferred efficiently from the associated equipment through the heat transferring member 19 and the metallic container 20 to the thermal sensing element 9.

Figure 11:
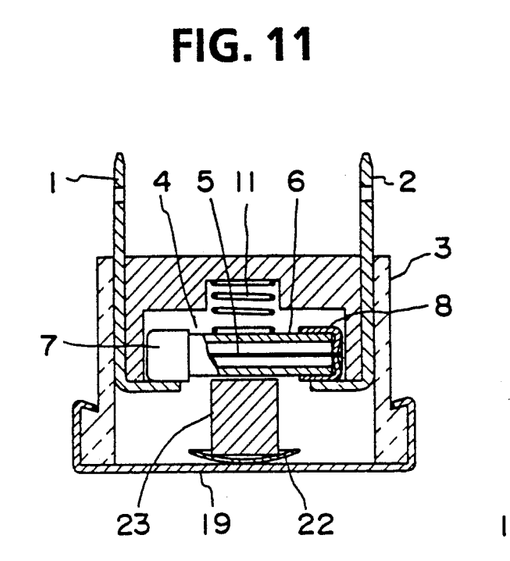
FIG. 11 is a longitudinal sectional front view of a thermal and current sensing switch in a fifth embodiment according to the present invention.
Figure 12:
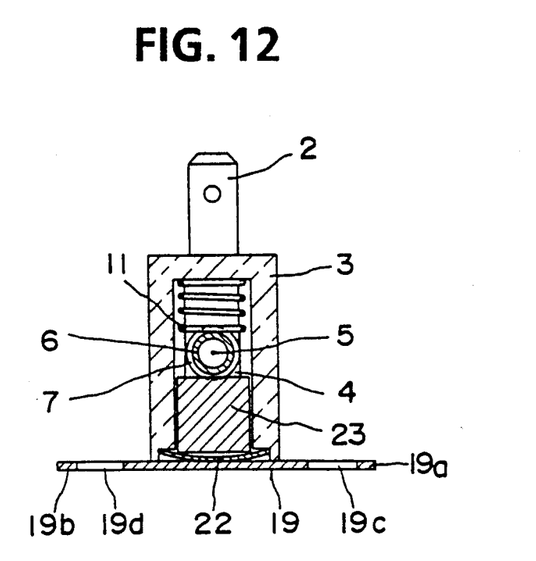
FIG. 12 is a longitudinal sectional side view of the thermal and current sensing switch of FIG. 11.
Figure 13:
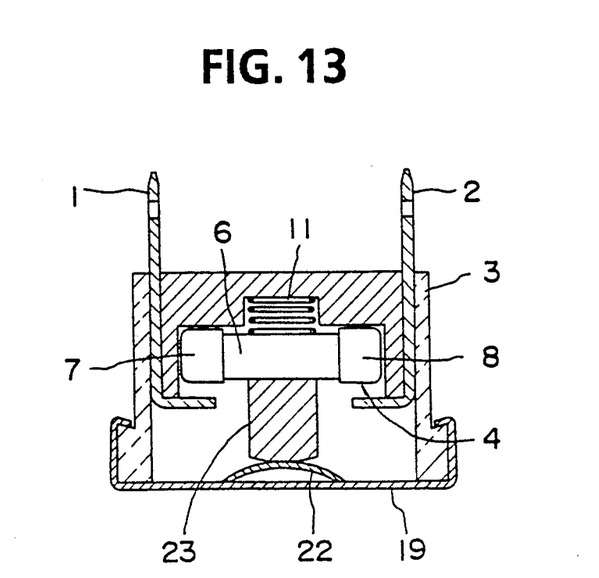
FIG. 13 is a longitudinal sectional front view of the thermal and current sensing switch of FIG. 11 in a state after a circuit breaking action.

Fifth Embodiment (FIGS. 11, 12, 13)

A thermal and current sensing switch in a fifth embodiment according to the present invention comprises a housing 3 having an open lower end, fixed conductors 1 and 2 each having an L-shaped lower end disposed within a cavity formed in the housing 3, a current fuse 4 placed within the cavity of the housing with the terminals 7 and 8 thereof in contact respectively with the lower ends of the fixed conductors 1 and 2, a pressing spring 11 placed in hole formed in the upper wall of the housing 3 so as to press the current fuse 4 against the lower ends of the fixed conductors 1 and 2, a heat transferring member 19 attached to the lower end of the housing 3 so as to close the same, a thermal sensing element 22 formed of a bimetallic plate or a shape memory alloy plate placed on the inner surface of the heat transferring member 19, and a separating member 23 provided between the current fuse 4 and the thermal sensing element 22. The thermal sensing element 22 is downward convex while the temperature thereof is below a predetermined temperature. When heated to the predetermined temperature due to rise in the ambient temperature, the thermal sensing element 22 becomes upward convex to push up the separating member 23, so that the current fuse 4 is separated from the fixed conductors 1 and 2 against the force of the pressing spring 11 to break the circuit, because the pushing force of the thermal sensing element 22 is greater than the force of the pressing spring 11.

Figure 14:
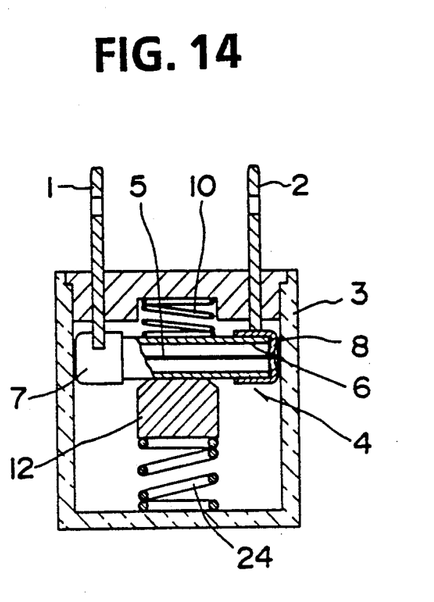
FIG. 14 is a longitudinal sectional front view of a thermal and current sensing switch in a sixth embodiment according to the present invention.
Figure 15:
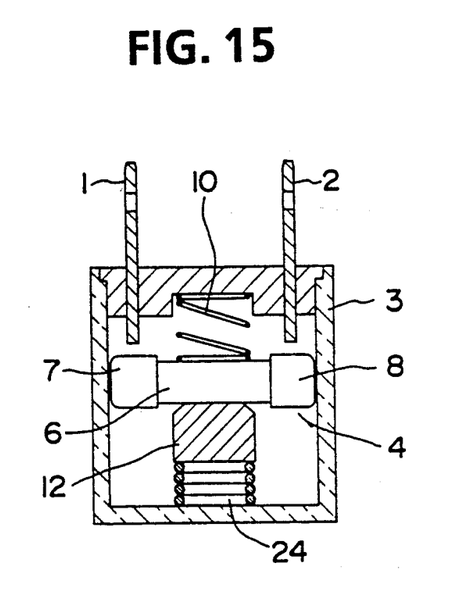
FIG. 15 is a longitudinal sectional front elevation of the thermal and current sensing switch of FIG. 14 in a state after a circuit breaking action.

Sixth Embodiment (FIGS. 14, 15)

A thermal and current sensing switch in a sixth embodiment according to the present invention is similar in construction as the thermal and current sensing switch of FIG. 1, except that the thermal and current sensing switch of FIG. 14 employs a pressing spring 24 formed of a shape memory alloy instead of the pressing spring 11, the spring seat 13 and the thermal sensing element 9 of the thermal and current sensing switch of FIG. 1. The pressing spring 24 serves both as a pressing spring and a thermal sensing element. At an ordinary temperature below a predetermined temperature, the force of the pressing spring 24 is greater than that of the separating spring 10, so that the current fuse 4 is pressed against the fixed conductors 1 and 2. When heated beyond the predetermined temperature, the pressing spring 24 contracts to restore its original shape as shown in FIG. 15 to allow the separating spring 10 to separate the current fuse 4 from the fixed conductors 1 and 2 to break the circuit.

Figure 16:
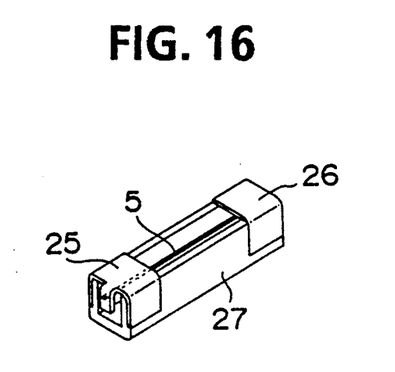
FIGS. 16 and 17 are perspective views of current fuses in accordance with the present invention.
Figure 17:
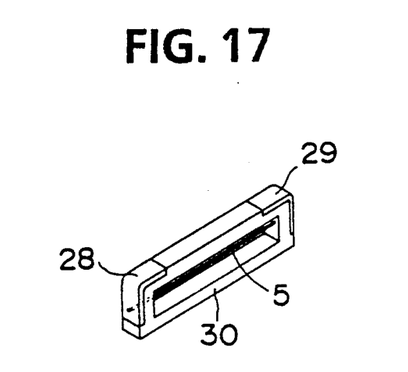

Modifications (FIGS. 16, 17)

Thermal and current sensing switches of the present invention may employ current fuses as shown in FIGS. 16 and 17.

A current fuse shown in FIG. 16 comprises a case 27 formed of an insulating material in the shape of a channel, terminals 25 and 26 attached respectively to the opposite ends of the case 27, and a fuse element 5 extended in the case 27 and attached at the opposite ends thereof to the terminals 25 and 26. The terminals 25 and 26 are formed by bending conductive strips.

A current fuse shown in FIG. 17 comprises a case 30 formed of an insulating material in a rectangular shape, terminals 28 and 29 attached respectively to the opposite ends of the case 30, and a fuse element 5 extended in a hole formed in the case 30 and attached at the opposite ends thereof to the terminals 28 and 29.

As is apparent from the foregoing description, according to the present invention, the electric circuit consisting of the fixed conductors and the current fuse provided with a current sensing element which responds to an overcurrent is separated from the thermal sensing element which responds to rise in the ambient temperature by the insulating member, a space, or the coil spring having a high resistance of heat transfer. Therefore, the thermal sensing element is surely insulated thermal as well as electrically from the current fuse. Accordingly, the thermal sensing element is scarcely subject to the influence of heat evolved in the electric apparatus by a current flowing through the electric circuit. Accordingly, the thermal sensing switch of present invention operates at high temperature sensing accuracy, and may be producible as a such type as responsive at a comparatively low temperature.

The heat transferring member attached firmly to the housing and the associated equipment transfers heat generated in the electric apparatus efficiently to the equipment to reduce the influence of the heat generated in the electric apparatus on the thermal sensing element to a substantially negligibly degree.

Since the influence of the heat evolved in the current sensing element on the thermal sensing element is for the most part insignificant, there is no restriction on the material of the current sensing element; the current sensing element may be formed of a metal having a comparatively high melting point, such as silver, copper, nickel, tungsten or an alloy of those metals. Thus the thermal and current sensing switch of the present invention has excellent time-current characteristics and excellent breaking performance under a large current, such as a short-circuit current, is capable of accurately responding to an overcurrent, and is capable of embodied in a device having a high rated current.

The current fuse comprising the insulating case the terminals attached to the insulating case, and the current sensing element fixed to the terminals can be manufactured individually by a process substantially the same as a conventional current fuse manufacturing process. The current sensing element may be formed in a strip, the case may be filled with an arc extinguishing material, a coil is incorporated into the device to make the device operate with a time lag, and the current sensing element may be tightened with a spring.

Since the current sensing element and the thermal sensing element are isolated electrically and thermal, the rated current and the rated temperature of the thermal and current sensing switch can independently be determined. Accordingly, the present invention provides thermal and current sensing switches of various ampere or temperature types respectively meeting various different working conditions, requires no protective device for discriminating between overcurrent and excessive temperature rise, and is capable of being applied to various fields of application.

Furthermore, there is no restriction on the material of the thermal sensing element; the thermal sensing element may be formed of a fusible metal, a fusible organic material, a bimetal, a shape memory alloy or any other suitable material meeting the characteristics.

Although the invention has been described in its preferred forms with a certain degree of particularity, many changes and variations are possible therein. It is therefore to be understood that the present invention may be practiced otherwise than as specifically described herein without departing from the scope and spirit thereof.

What is claimed is:

1. A thermal and current sensing switch comprising:
   a housing having a cavity;
   a pair of fixed conductors fixed to said housing, said fixed conductors having base ends extending in said cavity of said housing;
   a current fuse placed within said cavity of said housing, said current fuse having opposite terminals in contact respectively with said base ends of said fixed conductors;
   a separating elastic member biasing said current fuse away from said fixed conductors;
   a pressing elastic member providing a resilient pressing force pressing said opposite terminals of said current fuse in opposition to the bias of said elastic member and pressing said opposite terminals of said current fuse against said base ends of said fixed conductors; and
   a thermal sensing element which reduces the resilient pressing force of said pressing elastic member when the temperature of said thermal sensing element rises beyond a predetermined temperature to permit said current fuse to be separated from said fixed conductors.

2. A thermal and current sensing switch according to claim 1, wherein said housing is provided with a heat transferring member to be placed in close contact with associated equipment from which heat is transferred to said heat transferring member, said thermal sensing element being in direct contact with said heat transferring member.

3. A thermal and current sensing switch according to claim 1 or 2, wherein said thermal sensing element is formed of a fusible material which fuses above said predetermined temperature.

4. A thermal and current sensing switch according to claim 1 or 2, wherein said thermal sensing element is formed of a bimetallic plate, said plate bending a predetermined amount when at a temperature above said predetermined temperature.

5. A thermal and current sensing switch according to claim 1 or 2, wherein said thermal sensing element is a member formed of a shape memory alloy capable of deforming when at a temperature above said predetermined temperature and restoring to its original shape when at a temperature below said predetermined temperature.

6. A thermal and current sensing switch according to claim 1, wherein said housing is provided with a heat transferring member to be placed in contact with associated equipment from which heat is transferred to said heat transferring member, and a thermal conductive member disposed between said thermal sensing element and said heat transferring member.

7. A thermal and current sensing switch comprising:
a housing having a cavity;
a pair of fixed conductors fixed to said housing, said fixed conductors having base ends extending in said cavity of said housing;
a current fuse placed within said cavity of said housing, said current fuse having opposite terminals in contact respectively with said base ends of said fixed conductors;
a separating elastic member biasing said current fuse away from said fixed conductors;
a pressing elastic member providing a closure resilient pressing force pressing said opposite terminals of said current fuse in opposition to the bias of said elastic member and pressing said opposite terminals of said current fuse against said base ends of said fixed conductors;
said pressing elastic member being constructed of a shape memory alloy such that said pressing elastic member is operable to provide said closure resilient pressing force when the temperature of said pressing elastic member is below a predetermined temperature and wherein said closure resilient pressing force is reduced to a lesser resilient pressing force less than said closure resilient pressing force when the temperature of said pressing elastic member exceeds said predetermined temperature to thereby permit said current fuse to be separated from said fixed conductors by said separating elastic member.

* * * * *